Dec. 6, 1955  S. G. JOHNSON  2,725,637
CONCENTRICITY ATTACHMENT AND GAGE
Filed July 17, 1952
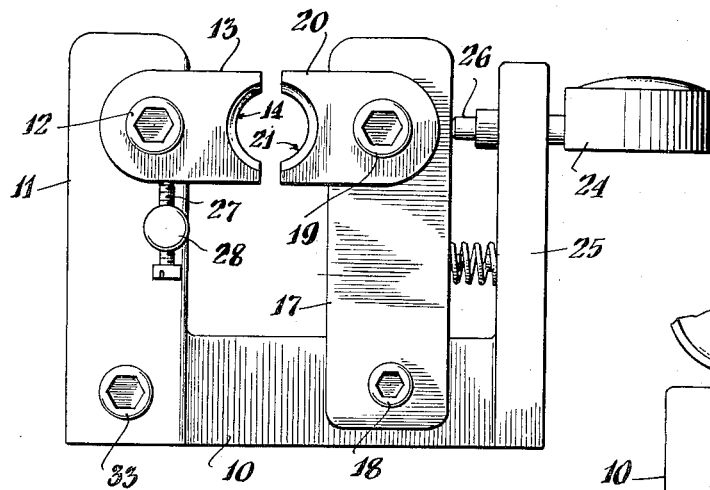
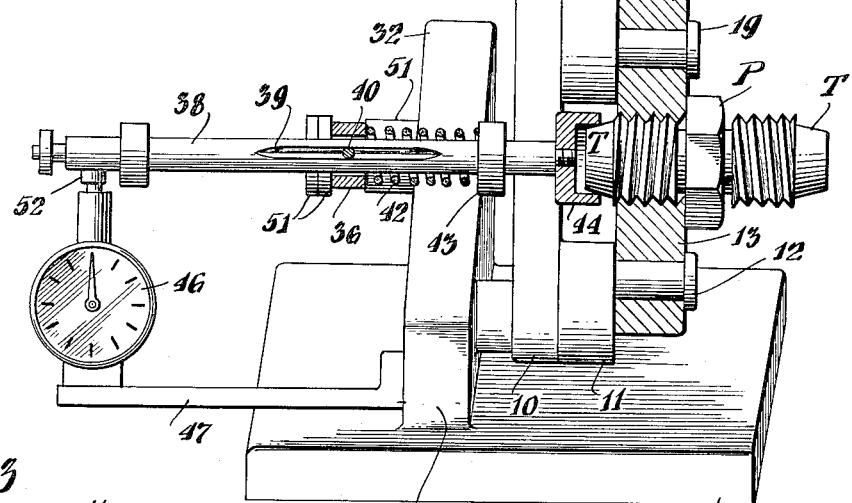
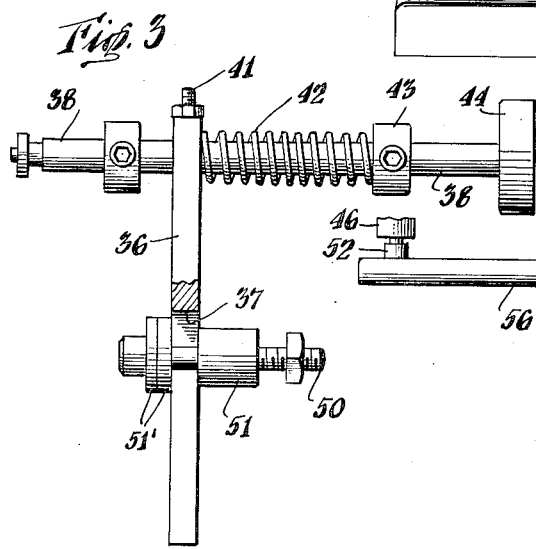
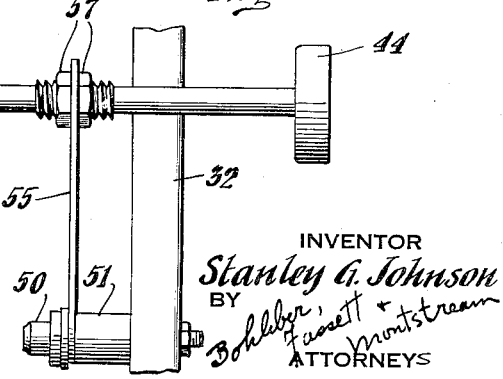
INVENTOR
Stanley G. Johnson
BY
Bohleber, Fassett & Montstream
ATTORNEYS United States Patent Office 2,725,637
Patented Dec. 6, 1955

2,725,637

CONCENTRICITY ATTACHMENT AND GAGE

Stanley G. Johnson, West Hartford, Conn., assignor, by mesne assignments, to The Johnson Gage Development Company, a corporation of Connecticut Application July 17, 1952, Serial No. 299,375

13 Claims. (Cl. 33—174)

The invention relates to an attachment for a gage for determining the concentricity or eccentricity of a portion of a test part such as a taper with respect to a cylindrical portion thereof. The cylindrical portion of the test part may be plain cylindrical or it may be screw threaded and in the latter case the concentricity or eccentricity of a tapered portion with respect to the thread is determined. Fittings for oil and gasoline lines and the like usually include a screw threaded portion and a tapered portion in which the latter forms the liquid or gas seal between the fitting and the coupling nut. In order to secure a tight seal it is essential that the tapered portion be concentric or closely concentric with the threaded portion. The gage attachment to be described tests for concentricity, and the complete combination of screw thread gage and attachment determines the acceptability of the threaded portion as well as the concentricity therewith of the tapered portion.

It is an object of the invention to construct an attachment for a gage which determines the concentricity of a tapered portion of a test part with respect to a cylindrical portion thereof and measures any eccentricity.

Another object of the invention is to construct a gage which determines the acceptability of a cylindrical portion of a test part and which also determines the concentricity or eccentricity of another portion of the test part with respect to the cylindrical porion.

Other objects of the invention will be more apparent from the following description when taken in connection with the accompanying drawings illustrating two embodiments of the invention in which:

Figure 1 is a side elevation of a gage for determining the acceptability of a cylindrical portion of a test part;

Figure 2 is a plan view of the gage of Figure 1 with portions thereof in section and with the attachment by which the concentricity of a tapered portion of the test part with respect to the cylindrical portion may be determined;

Figure 3 is a view of the concentricity attachment of Figure 2 showing the mounting post in elevation; and Figure 4 is a plan view of another form of the concentricity attachment.

The concentricity attachment may be used with any device which embraces the periphery or cylindrical portion of the test part whether plain cylindrical, threaded or the like, and permits rotation of the test part while so embraced. Many forms of gages for testing the acceptability of the cylindrical portion, embrace a test part in this fashion with the result that the attachment may be combined with the gage for testing the cylindrical surface. The combination of gage and attachment tests for two desirable factors which are to be known in connection with the acceptability of the test part, namely whether or not the cylindrical portion is within the allowable tolerances and whether or not a tapered portion of the test part is concentric with the cylindrical portion of the test part.

The drawings illustrate a gage as the means for embracing the cylindrical portion of the test part. The gage may be of many different kinds that particularly illustrated is similar to the gage shown in the Johnson Patent No. 2,433,516. The gage has a frame 10 of generally U-shaped form, one arm 11 of which carries a pivot pin or stud 12 upon which is swingably mounted a gage segment 13 having a gaging means 14, the gaging means particularly illustrated being a concave gaging surface. The gaging means may take other forms such as the rollers of the above referred to patent which for a screw thread would be ridged rollers. For a concave gaging surface to gage a screw thread, the surface is formed as an internal screw thread.

The gage particularly illustrated is a comparator type of gage in which the U-shaped frame carries an arm 17 pivoted to the frame on a pivot 18. The arm carries a pivot pin or stud 19 upon which is mounted a gaging segment 20 carrying a gaging means 21 thereon which cooperates with the gaging means or surface 14. This cooperating gaging means is shown as a concave surface and for gaging a screw thread it will be internally threaded. The gaging means may take any other form and may be one or more rollers as described with respect to the segment 13. The segments or their gaging surfaces move or pivot towards and away from each other by virtue of their being carried on a swingable or pivoted segment. The swingable arm 17 provides one means of giving one segment movement laterally towards and from the other gaging segment in order that it may take a position depending upon the diameter and other characteristics of the cylindrical portion of the test part. In its broadest aspect the gage described provides means for embracing the cylindrical portion of the test part and permitting rotation thereof when so embraced. In its preferred form it also gages the cylindrical portion of the test part.

Suitable indicating means such as a dial indicator 24 is carried by the frame, and particularly by an arm 25 thereof, and the operating pin 26 of the gage engages some part of the laterally movable gage mechanism in order to indicate the position of the gaging segment 20 when a test part is within the gaging means 14, 21 of the segments. The indicator is shown as engaging the swingable arm 17 which arm assumes a position corresponding to that of the gaging segment and hence corresponding to the diameter and other characteristics of the test part. The gage determines the over-all acceptability of the cylindrical portion of the test part whether it is a plain cylinder or a thread.

Means are utilized to halt the swinging of a segment when the center or axis of the test part or the axis of the gaging means is in gaging position. Gaging position is that position of the segments or gaging means in whch the gaging means form a circle. Usually and for a comparator type of gage, it is a position in which the axis of the gaging means is on a line between the centers of the pivot pins or studs 12 and 19. The end of a screw 27 threaded into a portion of the U-shaped frame such as a projection 28 forms a stop for halting the gaging segment 13 when it reaches gaging position. The test part retains the other segment in gaging position.

The gage may be mounted upon a base 31 which includes a wall 32 to which the gage frame 10 is secured such as by a bolt 33. The base is in effect a part of the frame and the gage usually is secured to the base at a convenient operating angle for the inspector.

The concentricity attachment includes a post or support 36 having a slot 37 for adjusting the position thereof with respect to the securing means 50, 51 or the base. The post carries a hole in which is received a lever 38. The lever is mounted in any desirable manner upon the post so that it will have a small pivotal movement; the mounting particularly used is a hole through the post which is a little larger than the lever. The lever is preferably prevented from rotating or turning upon its axis, as distinguished from pivoting on the post as a fulcrum, which may be accomplished by providing a longitudinally extending groove 39 in the lever in which is received a projection 40 formed by the end of a screw 41 threaded into the post. A spring 42 is provided around the lever between the post 36 and a collar 43 to propel the lever towards the taper of the test part.

The end of the lever 38 carries means for engaging a taper portion T on a test part P. This means is shown as a cup 44 threaded onto the end of the lever. The inner edge of the cup engages the tapered portion of the test part. The cup may be removed and a cup of a different diameter threaded onto the lever for a taper of a different size. The concentricity attachment therefore is adapted for testing the concentricity of tapers of different diameters. A dial indicator 46 is carried on a bracket 47 secured to the base wall 32 and engages the other end of the lever to indicate the movement thereof. The concentricity attachment is secured to the base in any suitable way such as by the bolt 50 and washers 51, as illustrated in Figure 4, and positioned so that the cup 44 is approximately in axial alignment with the test part when it is embraced by the comparator gage in gaging position.

In using the gage combination, the gaging segments 13 and 20 are in open or pivoted up position. A test part is inserted into the gaging means 14, 21 of the gaging segments and pressed thereinto so that the gaging segments swing towards gaging position until they are halted by the segment 13 engaging the stop screw 27. The movable gaging segment 20 has moved laterally by swinging of the arm 17 and the amount of movement depends upon the diameter of the cylindrical portion of the test part. The indicator 24 indicates the relative diameter thereof with respect to a perfect cylindrical portion or a master plug gage. The acceptability of the cylindrical portion is indicated by the indicator reading. The lever of the concentricity attachment is pulled axially so that the cup at the end thereof may be inserted over the tapered portion T of the test part.

The test part is then rotated in gaging position about a full revolution. If the pointer of the indicator 46 does not move then the tapered portion of the test part is concentric with the cylindrical portion. If the tapered portion is eccentric therewith, the cup on the lever will move in a circle therewith which movement will be transmitted to the other end of the lever and the lateral movement will be indicated on the indicator, the lever 38 pivoting on the post 36. Since the lever moves circularly or conically in the event of an eccentric taper, the contacting or operating pin 52 of the indicator should be flat so that the pin responds to the diametrical movement only of the lever. In order to be direct reading also, the indicator pin 52 should contact the lever at a distance from the post which is equal to the distance from the post to the cup.

If the cylindrical portion of the test part is a thread as particularly shown then the test part moves axially within the gaging means of the segments. The spring on the lever keeps the cup in contact with the lever irrespective of such axial movement. The concentricity indicator 46 in engaging a side of the lever 38 is therefore unaffected by any axial movement of the lever.

The eccentricity attachment of Figures 2 and 3 uses a rigid post 36 and the lever 38 is slidable axially with respect to the post. In the concentricity attachment of Figure 4, a flexible post 55, in the form of a flexible band such as of metal, has a lever 56 fixedly attached thereto such as by nuts 57. The post in this construction bends away from the test part in inserting the cup 44 on the taper portion T of the test part. The flexible post has flexibility towards and away from the test part as well as twisting flexibility but is rigid so far as the distance between the securing means 51 and the lever 56 is concerned. Alignment between the gaging means when in gaging position or the test part and the cup or lever is maintained, however, because the center of the lever maintains its position with respect to its point of attachment with the flexible post and the securing means 50, 51 which secures the post to the base. The lever is free to move conically under any movement engendered by eccentricity of the tapered portion so that a reading is secured upon the indicator 46. Such reading measures the extent of eccentricity of the tapered portion of the test part with respect to the cylindrical or threaded portion. The flexible post therefore provides a pivotal mounting for the lever. In this construction utilizing a flexible post, the lever 56 may move axially in the event the cylindrical portion of the test part is a screw thread. Since a full turn of the test part will give a full reading of any eccentricity, there is not enough axial movement to affect the eccentricity reading.

The concentricity attachment in the two forms shown includes a lever which carries means at the end thereof for engagement of a taper on a test part. Means are provided spaced from the end of the lever to pivotally support the lever and to resiliently retain the means or cup 44 carried by the lever in engagement with the tapered portion of the test part. This supporting means is the rigid post 36, the hole therein for the lever and the spring 42 of the construction of Figures 2 and 3 and is the flexible post 55 of the construction of Figure 4.

This invention is presented to fill a need for improvements in a concentricity gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A concentricity attachment for a gage comprising a rigid support, a lever mounted on the support intermediate the ends of the lever for pivotal movement and for axial movement including a groove in the lever and a screw carried by the support engaging in the groove, spring means to push the lever axially, means at one end of the lever for engaging that portion of the test part whose concentricity is to be determined, and an indicator engaging the lever adjacent its other end to indicate the pivotal movement of the lever.

2. A concentricity attachment for a gage comprising a support formed of a band of flexible material, means to attach the support to a frame, a lever secured to the support at a point spaced from the attaching means and providing the sole support for the lever, means carried by one end of the lever to engage a taper, and an indicator engaging the lever to indicate the pivotal movement of the lever.

3. A concentricity attachment for a gage comprising a support formed of a band of flexible material, means to attach the support to a frame, a lever secured to the support at a point spaced from the attaching means and providing the sole support for the lever, the lever having a length extending approximately equal distances on each side of the support, means carried by one end of the lever to engage a taper, and an indicator engaging the side of the lever at the other end thereof to indicate the pivotal movement of the lever.

4. A gage combination for testing the concentricity of one portion with respect to another portion of a test part comprising a frame, mechanism embracing a cylindrical portion of the test part for rotation therein and including a pair of cooperating members which open and close to receive a test part, means carried by the cooperating member to embrace a cylindrical portion of the test part, a lever, means carried by the frame pivotally supporting the lever in alignment with the cooperating members when in position embracing the test part and propelling the same axially, means at one end of the lever for engaging that portion of the test part whose concentricity is to be determined, and an indicator engaging the side of the lever to indicate the pivotal movement of the lever as the test part is rotated.

5. A gage combination for testing one portion of a test part for dimension and concentricity therewith of another portion of the test part comprising a frame, gaging mechanism embracing a cylindrical portion of the test part for rotation therein and including a pair of cooperating gaging members one of which is movable laterally with respect to the other, gaging means carried by each gaging member, an indicator controlled by the movable gaging member, a lever, means carried by the frame pivotally supporting the lever in alignment with the gaging means when in gaging position and propelling the same axially, means at one end of the lever for engaging that portion of the test part whose concentricity is to be determined, and an indicator engaging the side of the lever to indicate the pivotal movement of the lever as the test part is rotated.

6. A gage combination as in claim 5 in which the lever has a length extending approximately equal distances on each side of the means supporting the same, and the indicator engaging the side of the lever at the other end thereof.

7. A gage combination for testing the concentricity of one portion with respect to another portion of a test part comprising a frame; mechanism embracing a cylindrical portion of the test part for rotation therein including a pair of cooperating members which open and close to receive the test part, and means carried by each cooperating member to embrace a cylindrical portion of the test part; a lever, a rigid post carried by the frame pivotally supporting the lever in alignment with the embracing means when in embracing position, spring means propelling the lever axially, means at one end of the lever for engaging that portion of the test part whose concentricity is to be determined, and an indicator engaging the side of the lever to indicate the pivotal movement of the lever as the test part is rotated.

8. A gage combination for testing the concentricity of one portion with respect to another portion of a test part comprising a frame; mechanism embracing a cylindrical portion of the test part for rotation therein including a pair of cooperating members which open and close to receive the test part, and means carried by each cooperating member to embrace a cylindrical portion of the test part; a lever, a flexible post carried by the frame pivotally supporting the lever in aligment with the embracing means when in embracing position and propelling the lever axially, means at one end of the lever for engaging that portion of the test part whose concentricity is to be determined, and an indicator engaging the side of the lever to indicate the pivotal movement of the lever as the test part is rotated.

9. A gage combination for testing one portion of a test part for size and concentricity therewith of another portion of the test part comprising a frame; gaging mechanism embracing a cylindrical portion of the test part for rotation therein including a pair of cooperating gaging members one of which is movable laterally with respect to the other, gaging means carried by each gaging member; and an indicator controlled by the movable gaging member; a rigid post carried by the frame, a lever pivotally supported by the post in alignment with the gaging means when in gaging position and movable axially on the post, spring means propelling the lever axially, means at one end of the lever for engaging that portion of the test part whose concentricity is to be determined, and an indicator engaging the side of the lever to indicate the pivotal movement of the lever as the test part is rotated.

10. A gage combination as in claim 9 in which the lever has a length extending approximately equal distances on each side of the rigid post, and the indicator engaging the side of the lever at the other end thereof.

11. A gage combination as in claim 10 including a longitudinal groove in the lever, and a projection carried by the post extending into the groove.

12. A gage combination for testing one portion of a test part for size and concentricity therewith of another portion of the test part comprising a frame; gaging mechanism embracing a cylindrical portion of the test part for rotation therein including a pair of cooperating gaging members one of which is movable laterally with respect to the other, gaging means carried by each gaging member, and an indicator controlled by the movable gaging member; a lever, a flexible post carried by the frame pivotally supporting the lever in alignment with the gaging means when in gaging position and propelling the lever axially, mean at one end of the lever for engaging that portion of the test part whose concentricity is to be determined, and an indicator engaging the side of the lever to indicate the pivotal movement of the lever as the test part is rotated.

13. A gage combination as in claim 12 in which the lever has a length extending approximately equal distances on each side of the flexible post, and the indicator engaging the side of the lever at the other end thereof.

References Cited in the file of this patent

UNITED STATES PATENTS

| | | |
|---|---|---|
| 623,712 | Gustaf | Apr. 25, 1899 |
| 937,978 | Wheeler | Oct. 26, 1909 |
| 1,395,087 | Brion | Oct. 25, 1921 |
| 1,414,483 | Novitzky | May 2, 1922 |
| 1,486,019 | Hopkinson | Mar. 4, 1924 |
| 1,495,887 | Crane | May 27, 1924 |
| 2,425,381 | Lovick | Aug. 12, 1947 |
| 2,433,516 | Johnson | Dec. 30, 1947 |